(12) United States Patent
Prieto et al.

(10) Patent No.: US 11,465,229 B2
(45) Date of Patent: *Oct. 11, 2022

(54) FREQUENCY MODULATION FOR MAGNETIC PRESSURE PULSE TOOL

(71) Applicants: Carlos Prieto, Katy, TX (US); James Joseph Freeman, Houston, TX (US); Daniel Ewing, Katy, TX (US)

(72) Inventors: Carlos Prieto, Katy, TX (US); James Joseph Freeman, Houston, TX (US); Daniel Ewing, Katy, TX (US)

(73) Assignee: BAKER HUGHES, LLC, Houston, TX (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/180,355

(22) Filed: Feb. 19, 2021

(65) Prior Publication Data
US 2021/0170519 A1 Jun. 10, 2021

Related U.S. Application Data

(62) Division of application No. 15/343,722, filed on Nov. 4, 2016, now Pat. No. 11,014,191.
(Continued)

(51) Int. Cl.
*B23K 20/06* (2006.01)
*E21B 23/00* (2006.01)
(Continued)

(52) U.S. Cl.
CPC ............ *B23K 20/06* (2013.01); *B21D 26/14* (2013.01); *E21B 4/12* (2013.01); *E21B 23/00* (2013.01);
(Continued)

(58) Field of Classification Search
CPC B23K 20/06; B21D 26/14; E21B 4/12; E21B 23/00; E21B 23/01; E21B 31/20;
(Continued)

(56) References Cited

U.S. PATENT DOCUMENTS

| 3,810,372 A | 5/1974 | Queyroix |
| 4,255,975 A | 3/1981 | Debreuille |

(Continued)

FOREIGN PATENT DOCUMENTS

| GB | 1383605 A | 2/1974 |
| KR | 101529700 B1 | 6/2015 |

(Continued)

OTHER PUBLICATIONS

Arumugam, et al.; "Experimental Study of Electromagnetic Sheet Metal Forming Process", 12th Global Congress on Manufacutring & Management, Procedia Engineering 97 ( 2014 ) pp. 277-290; 14 pages total.

(Continued)

*Primary Examiner* — Yong-Suk (Philip) Ro
(74) *Attorney, Agent, or Firm* — Cantor Colburn LLP

(57) ABSTRACT

An apparatus for applying a magnetic pressure to a work piece includes an inductor configured to be disposed in proximity to the work piece and a controller electrically connected to the inductor and configured to control a supply of electrical power in order to output a first voltage over a selected frequency range to determine a frequency that provides a maximum current or a frequency that provides a current within a selected range of the maximum current to the inductor.

7 Claims, 3 Drawing Sheets

Related U.S. Application Data

(60) Provisional application No. 62/374,150, filed on Aug. 12, 2016.

(51) Int. Cl.

| | | |
|---|---|---|
| *E21B 4/12* | (2006.01) | |
| *E21B 33/134* | (2006.01) | |
| *B21D 26/14* | (2006.01) | |
| *E21B 41/00* | (2006.01) | |
| *E21B 23/01* | (2006.01) | |
| *E21B 31/20* | (2006.01) | |
| *E21B 33/12* | (2006.01) | |
| *E21B 43/08* | (2006.01) | |
| *E21B 43/10* | (2006.01) | |
| *E21B 47/00* | (2012.01) | |

(52) U.S. Cl.
CPC .............. *E21B 23/01* (2013.01); *E21B 31/20* (2013.01); *E21B 33/12* (2013.01); *E21B 33/134* (2013.01); *E21B 41/00* (2013.01); *E21B 43/08* (2013.01); *E21B 43/10* (2013.01); *E21B 47/00* (2013.01)

(58) Field of Classification Search
CPC ........ E21B 33/12; E21B 33/134; E21B 41/00; E21B 43/08; E21B 43/10; E21B 47/00
See application file for complete search history.

(56) References Cited

U.S. PATENT DOCUMENTS

| | | | |
|---|---|---|---|
| 4,619,127 A | 10/1986 | Sano et al. | |
| 4,716,960 A * | 1/1988 | Eastlund | E21B 36/04 |
| | | | 439/193 |
| 4,825,954 A | 5/1989 | Baugh | |
| 5,030,873 A | 7/1991 | Owen | |
| 5,188,177 A * | 2/1993 | Curry | E21B 33/02 |
| | | | 166/66.5 |
| 5,826,320 A | 10/1998 | Rathke et al. | |
| 5,955,934 A | 9/1999 | Raj | |
| 6,384,389 B1 * | 5/2002 | Spencer | E21B 33/13 |
| | | | 166/60 |
| 6,474,534 B2 | 11/2002 | Gabbianelli et al. | |
| 7,199,480 B2 | 4/2007 | Fripp et al. | |
| 7,301,429 B1 | 11/2007 | Hall et al. | |
| 8,061,443 B2 | 11/2011 | Hall et al. | |
| 8,662,169 B2 | 3/2014 | Cortez | |
| 9,476,277 B2 | 10/2016 | Stamatakis | |
| 10,227,860 B1 | 3/2019 | McMullen | |
| 11,014,191 B2 * | 5/2021 | Prieto | B23K 20/06 |
| 2004/0079524 A1 | 4/2004 | Bass et al. | |
| 2004/0084381 A1 | 5/2004 | Korenev | |
| 2004/0084442 A1 | 5/2004 | Larovere | |
| 2004/0263004 A1 | 12/2004 | Krokoszinski et al. | |
| 2005/0097934 A1 | 5/2005 | Park | |
| 2006/0081684 A1 | 4/2006 | Moore | |
| 2006/0131300 A1 | 6/2006 | Yablochnikov | |
| 2008/0061789 A1 | 3/2008 | Coates et al. | |
| 2009/0085701 A1 | 4/2009 | Veneruso et al. | |
| 2009/0166045 A1 | 7/2009 | Wetzel et al. | |
| 2009/0289808 A1 | 11/2009 | Prammer | |
| 2010/0000742 A1 | 1/2010 | Bonner et al. | |
| 2012/0169334 A1 | 7/2012 | Hopper et al. | |
| 2014/0238662 A1 | 8/2014 | Prieto | |
| 2014/0239957 A1 | 8/2014 | Zhang et al. | |
| 2014/0328139 A1 | 11/2014 | Minto et al. | |
| 2015/0159475 A1 | 6/2015 | Prieto et al. | |
| 2015/0308228 A1 | 10/2015 | Vick, Jr. et al. | |
| 2015/0328712 A1 | 11/2015 | Grubb | |
| 2016/0040506 A1 | 2/2016 | Goodman et al. | |
| 2016/0097268 A1 | 4/2016 | Okoniewski et al. | |
| 2016/0175980 A1 | 6/2016 | Golovashchenko et al. | |
| 2017/0266752 A1 | 9/2017 | Apel et al. | |
| 2018/0038972 A1 | 2/2018 | Gresillon et al. | |
| 2018/0043463 A1 | 2/2018 | Prieto et al. | |
| 2018/0045006 A1 | 2/2018 | Prieto et al. | |
| 2018/0045007 A1 | 2/2018 | Prieto et al. | |
| 2018/0080296 A1 | 3/2018 | Prieto et al. | |
| 2018/0188413 A1 | 7/2018 | Capoglu et al. | |
| 2019/0249522 A1 | 8/2019 | Ewing et al. | |

FOREIGN PATENT DOCUMENTS

| | | |
|---|---|---|
| WO | 0181021 A2 | 11/2001 |
| WO | 2007132468 A1 | 11/2007 |
| WO | 2010135492 A2 | 11/2010 |

OTHER PUBLICATIONS

Bay, et al.; "Electromagnetic forming processes: material behaviour and computational modelling"; 11th International Conference on Technology, Nagoya, Japan; Procedia Engineering 81 ( 2014 ) 793-800, 8 pages total.

Buckley "An introduction to Eddy Current Testing theory and technology" technical paper eddyc.pdf available from the internet at http://joe.buckley.net/papers; Sep. 8, 2003 (pp. 1-7).

Gayakwad, et al.; "A Reviewon Electromagnetic Forming Process; 3rd International Conference on Materials Processing and Characterisation"; Procedia Materials Science 6 ( 2014 ) 520-527, 8 pages total.

Kinsey, et al. "Electromagnetic forming and Joining of Dissimilar Materials"; I/URC for Metal Deformatin Processes Planning Meeting, Evanston, IL; Mar. 14-15, 2017; 10 pages.

Miranda et al. "Magnetic pulse welding on the cutting edge of industrial applications." Soldagem & Inspeção 19.1 (2014): 69-81.

Notification of Transmittal of the International Search Report and the Written Opinion of the International Searching Authority, or the Declaration; PCT/US2017/046289; dated Nov. 20, 2017 (pp. 1-9).

Notification of Transmittal of the International Search Report and the Written Opinion of the International Searching Authority, or the Declaration; PCT/US2017/046296; dated Nov. 22, 2017; 10 pages.

Notification of Transmittal of the International Search Report and the Written Opinion of the International Searching Authority, or the Declaration; PCT/US2017/046298; dated Nov. 22, 2017; 12 pages.

Notification of Transmittal of the International Search Report and the Written Opinion of the International Searching Authority, or the Declaration; PCT/US2017/047507; dated Oct. 31, 2017; 8 pages.

Otin, et al., "A Frequency Domain Approach for Computing the Lorentz Force in Electromagnetic Metal Forming" International Center for Numerical Methods in Enginnering; 2004-2007; 50 pages.

Otin, et al., "Electromagnetic Metal Forming"; CIMNE—International Center for Numerical Methods in Engineering, Barcelona, Spain; Jul. 2011; 37 pages.

Popovic, et al. Introductory Electromagnetics; Chapter 20—Skin Effects, p. 382-392; Prentice Hall (2000).

Psyk, et al., "Electromagnetic forming—A review"; Journal of Materials Processing Technology 211 (2011) pp. 787-829.

Psyk, et al.; "Process Model and Design for Magnetic Pulse Welding by Tube Expansion"; 5th Internatational Conference on High Speed Forming, 2012; 10 pages.

Senthilnathan, et al.; "A two stage finite element analysis of electromagnetic forming of perforated aluminium sheet metals"; 12th Global Congress on Manufacturing and Management; Procedia Engineering 97 ( 2014 ) 1135-1144; 10 pages total.

Yu, Haiping; "Effects of current frequency on electromagnetic tube compression"; Journal of Materials Processing Technology, Jan. 2009; 8 pages.

* cited by examiner

FREQUENCY MODULATION FOR MAGNETIC PRESSURE PULSE TOOL

CROSS REFERENCE TO RELATED APPLICATION

This application is a divisional of and claims priority to U.S. application Ser. No. 15/343,722 filed Nov. 4, 2016, which claims priority to U.S. Provisional Application Ser. No. 62/374,150 filed Aug. 12, 2016, the disclosure of which is incorporated by reference herein in its entirety.

BACKGROUND

Many types of work-related actions require a force or pressure to be exerted upon a work piece. Typically, the exerted force or pressure may cause movement of the work piece and/or deformation of the work piece resulting in the work piece being connected to another work piece. A conventional magnetic pressure pulse tool is one type of tool that can exert the required force or pressure to cause the movement or deformation of the work piece. While such tools existing in the art are useful for their intended purposes, such as magnetic pulse welding tools, the art is always receptive to improvements in tools, processes or efficiencies.

SUMMARY

Disclosed is an apparatus for applying a magnetic pressure to a work piece. The apparatus includes: an inductor configured to be disposed in proximity to the work piece; and a controller electrically connected to the inductor and configured to control a supply of electrical power in order to output a first voltage over a selected frequency range to determine a frequency that provides a maximum current or a frequency that provides a current within a selected range of the maximum current to the inductor.

Also disclosed is a method for applying a magnetic pressure to a work piece. The method includes: providing an input to a power supply to select a first output voltage using a controller, the power supply being coupled to an inductor that is disposed in proximity to the work piece; providing an input to the power supply to vary a frequency of the first output voltage over a selected frequency range using the controller; and determining a frequency that provides a maximum electrical current or a frequency that provides a current within a selected range of the maximum current at the first voltage to the inductor using the controller.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are embodiments of apparatuses and methods that use a frequency-modulated magnetic pressure pulse for applying a magnetic pressure to a work piece. The apparatuses and methods provide for applying a magnetic pressure pulse having a magnitude that is greater than the magnitude of the pressure pulse that can be applied by a conventional magnetic pressure pulse tool for a given work piece by matching the natural resonant frequency of an electrical circuit applying the magnetic pressure pulse to the natural resonant frequency of the work piece. Alternatively or in addition, the apparatuses and methods can provide for controlling the magnitude of the magnetic pressure pulse so that a magnetic pressure pulse of a defined magnitude is applied where the defined magnitude is related to the type of work to be performed. The application of the magnetic pressure pulse can be used to move or deform the work piece in non-limiting embodiments. While the term "pressure" is used with respect to a magnetic pulse, this term is inclusive of the term "force" when the magnetic pressure pulse is applied to an area of known size.

The apparatuses and methods that provide the frequency-modulated magnetic pressure pulse may be used for work-related actions above the surface of the earth and/or subterranean work-related actions. The subterranean actions may involve those completion actions in a borehole penetrating the earth relating to recovery of hydrocarbons from earth formations. Alternatively or in addition to completion actions, the magnetic pressure pulse or pulses may be used in other downhole embodiments requiring downhole actuation actions such as in geothermal wells, injection wells, or disposal wells as non-limiting examples.

Figure 1:
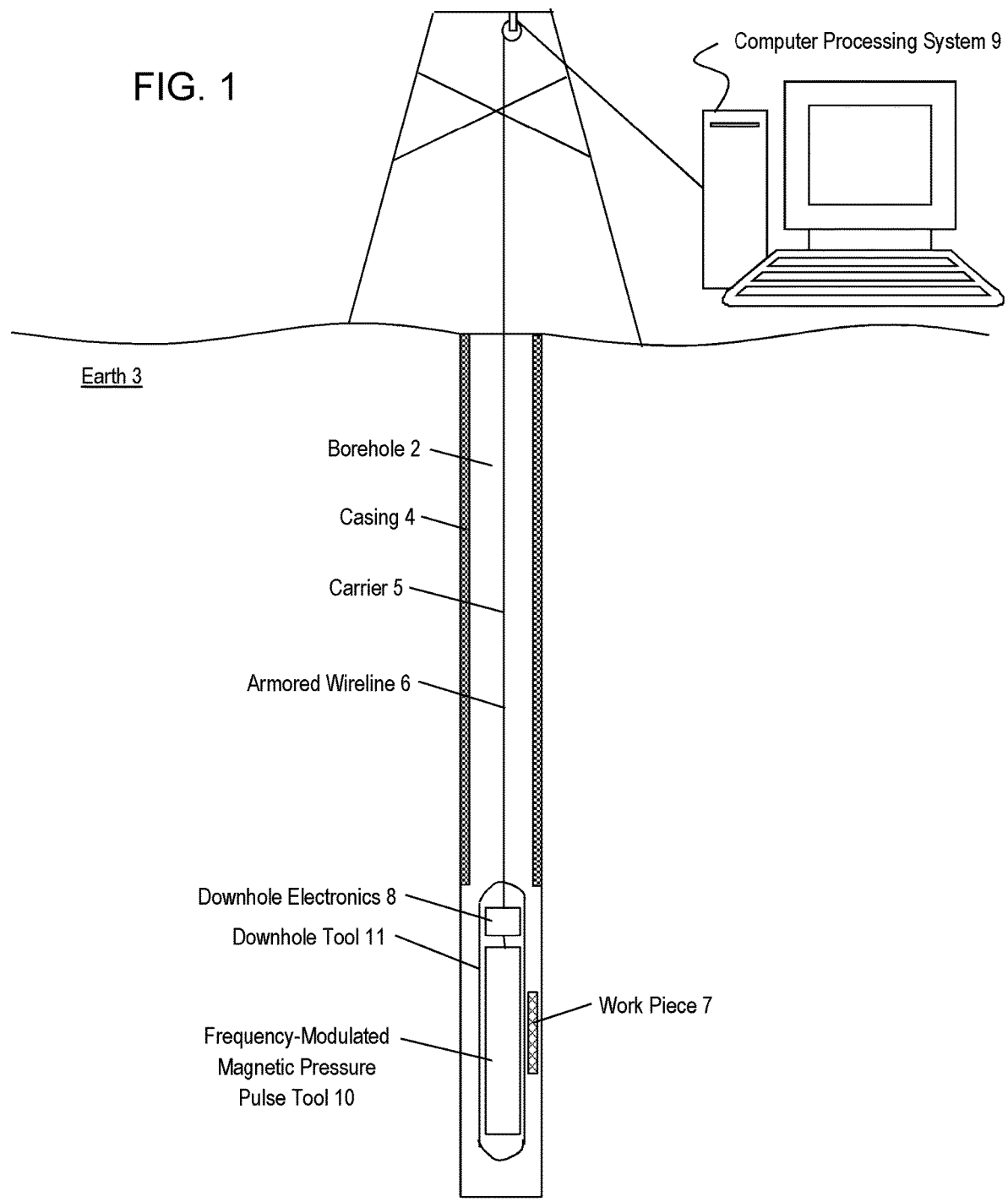
FIG. 1 is a cross-sectional view of an embodiment of a frequency-modulated magnetic pressure pulse tool disposed in a borehole penetrating the earth.

FIG. 1 is a cross-sectional view of an embodiment of a frequency-modulated magnetic pressure pulse tool 10 disposed in a borehole 2 penetrating the earth 3. The borehole 2 may be lined by a casing 4. The frequency-modulated magnetic pressure pulse tool 10 is conveyed through the borehole 2 by a carrier 5, which can be an armored wireline 6 in one or more embodiments. Alternatively, the tool 10 may be self-contained and lowered in on drill pipe in a non-limiting embodiment. The frequency-modulated magnetic pressure pulse tool 10 is configured to apply a magnetic pressure pulse or force pulse to a work piece 7. It can be appreciated that the frequency-modulated magnetic pressure pulse tool 10 may be incorporated as a component in a downhole tool 11 for performing a task requiring the application of a pressure or force pulse to the work piece 7. In a non-limiting embodiment, the task may include securing a device to the casing 4 such as by bonding or welding in non-limiting embodiments. The downhole tool 11 may include downhole electronics 8 for controlling operation of the downhole tool 11 and/or providing an interface for communicating with a surface computer processing system 9. Processing and/or control functions that may include magnetic pulse activation may be performed by the downhole electronics 8, the surface computer processing system 9 or a combination thereof.

Figure 2:
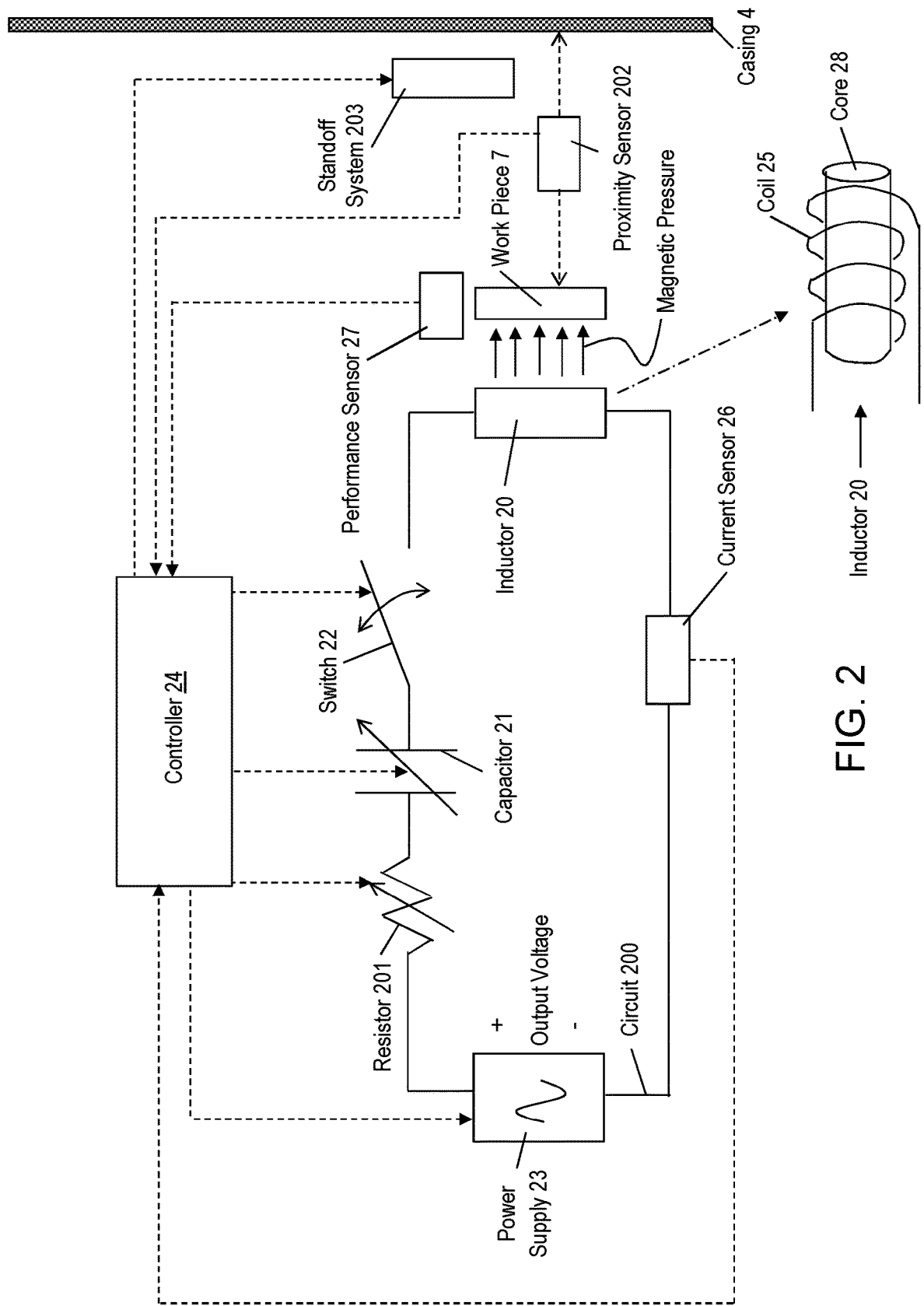
FIG. 2 is a schematic diagram of the frequency-modulated magnetic pressure pulse tool.

FIG. 2 is a schematic diagram of the frequency-modulated magnetic pressure pulse tool 10. The frequency-modulated magnetic pressure pulse tool 10 includes a circuit 200 having an inductor 20, an optional capacitor 21, an optional resistor 201, a switch 22, a power supply 23, and a controller 24, which may be incorporated in the downhole electronics 8. The inductor 20 is configured to produce a changing magnetic field to induce eddy currents in the work piece 7. Accordingly, the work piece 7 is a material having free electrons such as metal or a material with a free electron material infused in it. In one or more embodiments, the infused material may include a plastic or viscoelastic material. In general, an alternating electrical current flows through the inductor 20 and generates a magnetic field having a varying magnitude. The varying magnetic field in turn induces eddy currents in the work piece that create a magnetic field that opposes the magnetic field of the inductor 20. The opposing magnetic fields generate a pressure or force between the inductor 20 and the work piece 7 causing a magnetic pressure or force to be imposed on the work piece 7. Because of the alternating current having a high current magnitude, the alternating current is generally applied for a short time period such as less than a second in order to not damage electrical conductors or cables connecting the various components together. Accordingly, the applied magnetic pressure or force may be referred to as a pulse. It can be appreciated that alternating current having a sinusoidal shape is but one form of alternating current that may be applied. Other forms of alternating current (AC) include square-waves, pulse-width modulation (PWM), or current having other shapes that mimic AC power.

In one or more embodiments, the inductor 20 is a coil 25 having one or more turns of a conductor or wire. In one or more embodiments, the coil 25 is wrapped around a core 28 configured to conduct and focus a magnetic flux generated in a desired geometry by current flowing through the coil 25. In one or more embodiments, the core 28 may be metallic or metallic infused liquid, plastic or elastomer or a combination thereof. It can be appreciated that the inductor 20, coil 25, and/or core 28 may have various forms or shapes depending of the job intended to be performed by the magnetic pressure pulse tool 10. For example, the coil 25 illustrated in FIG. 2 may be inserted into a close-fitting tubular in order to expand the tubular with magnetic pressure. The coil 25 illustrated in FIG. 2 may be placed around a tubular in order to compress it, or collapse it against a close fitting tubular. If the tubular is inside another tubular, the expanded tubular may be secured to another close-fitting tubular surrounding the expanded tubular. The secured connection may be a friction fit or a cold weld depending on the amount of applied magnetic pressure. In one or more embodiments, the magnetic pressure may be used to deform the work piece in order to create a shoulder that interlocks with another work piece.

The optional capacitor 21 when included is configured to provide a selected resonant frequency of the circuit 200 that includes the inductor 20. The capacitor 21 may have a fixed capacitance value or the capacitor 21 may be adjustable, either manually or remotely by the controller 24, to provide an adjustable range of capacitance values.

The power supply 23 is configured to provide electrical power at a variable voltage output and a variable frequency to the inductor 20. Accordingly, the power supply 23 is further configured to have the output voltage and frequency controlled by the controller 24. It can be appreciated that in one or more alternative embodiments, the output voltage of the power supply may be kept constant and the power applied to the inductor 20 varied by using the optional variable resistor 201 in the circuit 200. Hence, the low power may be applied to the inductor 20 to determine the resonant frequency of the work piece and high power applied to the work piece to accomplish the desired work. In one or more embodiments, the power supply 23 may be disposed downhole or at the surface of the earth. In one or more embodiments, the power supply may include a DC power source such as a battery and an inverter that provides voltage and current at a desired frequency. It can be appreciated that in one or more embodiments, the power supply 23 may include pre-charged capacitors to provide the electrical power to the inductor 20.

The switch 22 is configured to provide for completing the circuit 200 and, thereby, applying the output of the power supply to the inductor 20. The switch 22 may be manually controlled or remotely controlled such as by the controller 24. Control functions include opening and/or closing of the switch 22.

The controller 24 is configured to control the position of the switch 22 and the output voltage and output frequency of the power supply 23 in accordance with one or more operational sequences or algorithms. The controller 24 may include only one operational sequence or algorithm if only one type of work application requiring a specific magnetic pressure is desired. Alternatively, the controller 24 may include several operational sequences or algorithms if several different types of work applications requiring several different magnetic pressures are desired. It can be appreciated that a particular type of work application may require multiple magnetic pulses in order to accomplish the desired work.

The operational sequence or algorithm is configured to apply a magnetic pressure of a selected magnitude. In one or more embodiments, the selected magnitude is a maximum magnitude for the available output voltage of the power supply 23. Alternatively, the selected magnitude may be within a selected range of the maximum magnitude (e.g., within 50% of the maximum magnitude). Because the work piece 7 may have a resonant frequency (i.e., an electrical resonant frequency), the controller 24 is configured to determine the resonant frequency so that the power supply 23 can supply electrical current at that frequency in order to provide the maximum magnetic pressure (or selected magnetic pressure magnitude). The resonant frequency results in the maximum current flowing through the inductor 20 and, thus, the maximum magnetic pressure being applied by the inductor 20 to the work piece 7. In one or more embodiments, the resonant frequency is determined by applying a low voltage to the inductor 20. The voltage is low enough so as not to cause any meaningful magnetic pressure to the work piece such as causing permanent deformation of the work piece. While the low voltage is applied, the frequency is swept through a selected range of frequencies. The low voltage may be applied as AC, DC-pulsing, or PWM in non-limiting embodiments. A current sensor 26 is configured to sense an amount of current flowing through the inductor 20 and provide an input to the controller 24. The controller 24 using the current input from the sensor 26 is configured to determine the frequency at which the maximum current flow occurs. When a current peak is detected, it is an indication that the current applied to the inductor 20 is at the resonant frequency or an integer multiple of the resonant frequency (i.e., harmonic frequency). By sweeping through a wide enough range of frequencies, the resonant frequency can be determined. Once the resonant frequency is determined, the maximum voltage or a selected voltage available from the power supply 23 is applied to the capacitor 21 at the resonant frequency. In general, the maximum voltage or the selected voltage results in the magnetic pressure accomplishing the desired work application such as for example deforming the work piece 7. Hence, the maximum voltage or the selected voltage is generally much greater than the low voltage for determining the resonant frequency.

It can be appreciated that, depending on a specific work application, a certain amount of magnetic pressure that is less than an available maximum amount of magnetic pressure may be desired to accomplish the specific work application. In these applications, the output voltage from the power supply 23 may be set by the controller 24 to a voltage less than the available maximum voltage. Alternatively or in addition, the frequency of the output voltage may be adjusted a selected amount from the resonant frequency of the work piece.

In one or more embodiments, the frequency-modulated magnetic pressure pulse tool 10 may include a performance sensor 27 disposed on or near the work piece 7. The performance sensor 27 is configured to sense the performance of the applied magnetic pressure pulse to the work piece 7. Non-limiting embodiments of the performance sensor 27 include a position sensor, a velocity sensor and an accelerometer. A sensed performance measurement can be input to the controller 24. In one or more embodiments the controller 24 may be configured to compare the sensed performance measurement to a threshold. It can be appreciated that if a sensed performance measurement falls short of the threshold, then the controller may be configured to increase the magnitude of the magnetic pressure applied to the work piece 7 such as by increasing the output voltage of the power supply 23 and/or by increasing the capacitance of capacitor 21 (when the capacitor 21 is a variable capacitor).

In one or more embodiments, the frequency-modulated magnetic pressure pulse tool 10 includes a proximity sensor 202 as illustrated in FIG. 2. The proximity sensor 202 is configured to sense a gap between two work pieces. In electromagnetic welding, there is an optimal gap between two work pieces to ensure the proper speed at impact of one work piece to the other work piece such as a casing for example and, thus, ensure the proper speed is applied for welding or bonding. In one example, the proximity sensor(s) is used to detect the distance from the casing to where the workpiece is located. Using multiple sensors, it can also be used to determine the centralization of the workpiece. If the workpiece is off center of the casing, the impact velocity would occur more on one side than the other and may reduce the quality of the forming and fusing (welding). The proximity sensor would feed data back to the controller (such as in a feedback control loop) which in turn would control a standoff system 203 to stand the workpiece off away from the casing and centralize it. In one or more embodiment, pads controlled by the controller may be expanded with hydraulic, electrical, or mechanical actuators in order to centralize the work piece or place the work piece at a desired position. Alternatively, based on the proximity sensor input, the controller may decide how much voltage/frequency is needed to expand the workpiece out to the optimal gap location using one or more magnetic pressure pulses. The workpiece may also be moved out to optimal gap by swaging. The standoff system technique or other centralization techniques may also be used to centralize the inductor inside of the workpiece.

The performance sensor 27 or a separate sensor may be used to determine the quality of the weld. This sensor may be activated after the welding process is complete. It can transmit the data back to surface via mud pulses or wireline for example or it could be store locally and reviewed when the tool is brought up hole. The sensor output may be used to determine if additional work is needed on the weld or if it is acceptable.

In work applications that require a specific amount of magnetic pressure to be applied to the work piece 7, the output voltage of the power supply 23 and/or the frequency of the output voltage may be determined by analysis and/or testing of a specific configuration of the magnetic pressure pulse tool 10 required for the selected work application.

Figure 3:
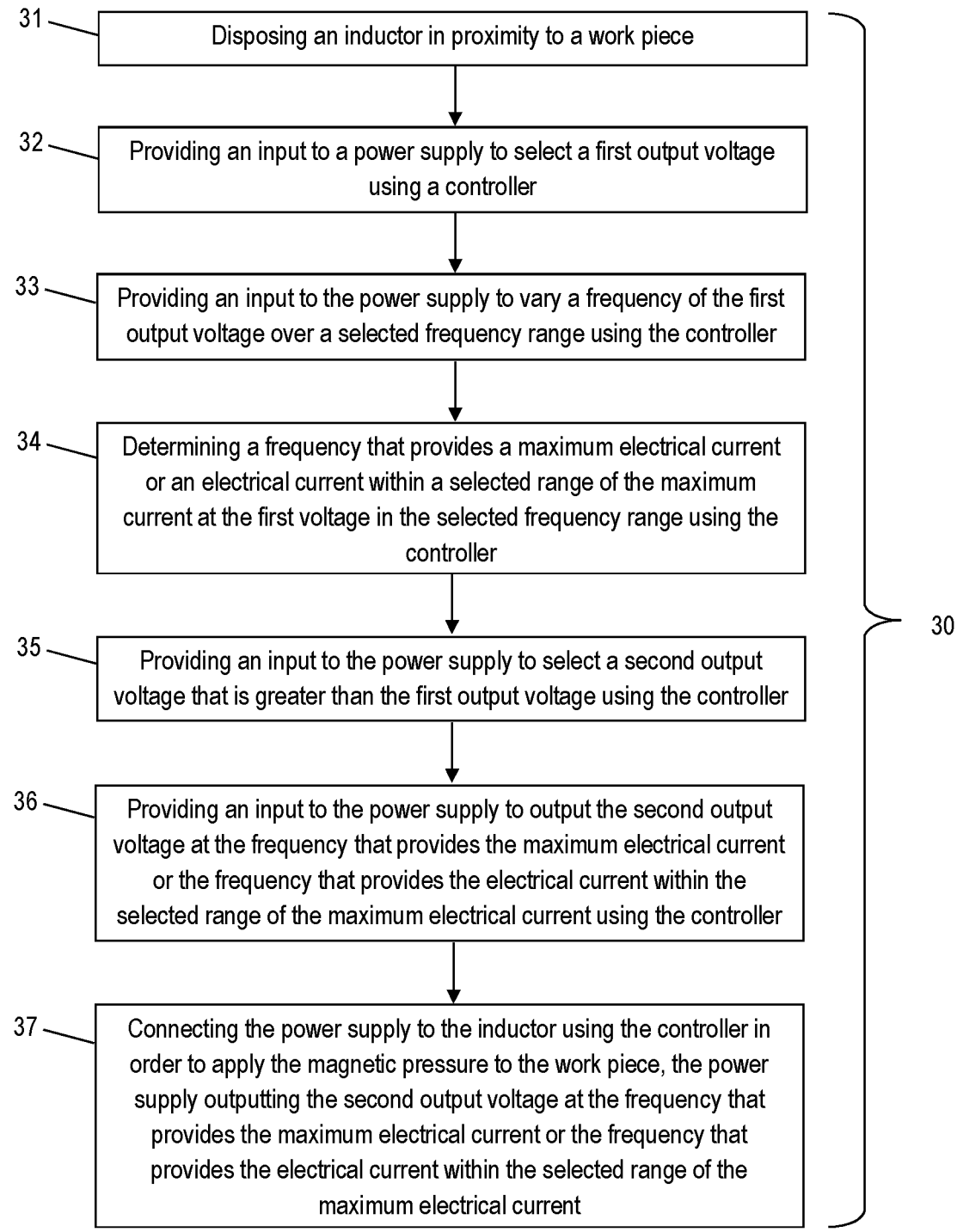
FIG. 3 is a flow chart for a method for applying a magnetic pressure to a work piece.

FIG. 3 is a flow chart for a method 30 for applying a magnetic pressure to a work piece. Block 31 calls for disposing an inductor in proximity to the work piece. The term "proximity" relates to the inductor being close enough to the work piece to induce desired eddy currents in the work piece. This block may also include selecting a configuration of the inductor that is appropriate for the work application requiring the magnetic pressure.

Block 32 calls for providing an input to a power supply to select a first output voltage using a controller. Block 33 calls for providing an input to the power supply to vary a frequency of the first output voltage over a selected frequency range using the controller. Block 33 may also include providing an input to a switch to connect the power supply at the first voltage to the inductor at the selected frequency range using the controller. Block 34 calls for determining a frequency that provides a maximum electrical current or an electrical current within a selected range of the maximum current at the first voltage in the selected frequency range using the controller. In one or more embodiments, the selected range is close to the frequency corresponding to the maximum current such as 10% as a non-limiting example. Block 34 may also include sensing electrical current flowing through the inductor due the first voltage and receiving an input from a current sensor configured to sense the electrical current flowing through the inductor using the controller.

Block 35 calls for providing an input to the power supply to select a second output voltage that is greater than the first output voltage using the controller. Block 36 calls for providing an input to the power supply to output the second output voltage at the frequency that provides the maximum electrical current or the frequency that provides the electrical current within the selected range of the maximum electrical current using the controller. Block 37 calls for connecting the power supply to the inductor using the controller in order to apply the magnetic pressure to the work piece, the power supply outputting the second output voltage at the frequency that provides the maximum electrical current or the frequency that provides the electrical current within the selected range of the maximum electrical current.

The method 30 may also include sensing electrical current flowing through the inductor using a current sensor and providing the sensed current measurement to the controller 24 as input. The sensed current can then be used to determine the maximum current or the current within the selected range of the maximum current while the frequency is being varied at the first voltage.

The method 30 may also include sensing performance of the magnetic pressure on the work piece using a performance sensor configured to sense the performance. In one or more embodiments, the performance sensor is configured to sense position, velocity and/or acceleration of the work piece.

The method 30 may also include the controller 24 interrupting the conduction of electrical current into the inductor 20 when performance of the work piece exceeds a performance threshold value as measured by the performance sensor.

The method 30 may also include adjusting a resonant frequency of a circuit having the inductor using a capacitor in the circuit. The capacitor may be adjusted remotely using the controller.

The method 30 may also include sensing a proximity of the work piece to another work piece using a proximity sensor. The distance between the work piece and the another work piece may be adjusted using a standoff system to be at a selected distance. It can be appreciated that the selected distance is a function of the desired work to be accomplished.

In an alternative embodiment, the first voltage and the second voltage are the same or nearly the same such as with 10% in a non-limiting embodiment. Low power is used to determine the frequency in block 34 using a variable resistor in a circuit having the inductor. The power is low enough so as not to perform the desired work. The variable resistor may be remotely controlled by the controller. Consequently, high power (greater than the low power) is provided to the inductor in block 37 at the first voltage or nearly the same voltage to perform the desired work by changing or lowering the resistance of the variable resistor.

The following method allows the prediction of movement of the workpiece in the downhole environment to determine its final position and velocity curve. For a tubular workpiece, this method involves first knowing the workpiece's inner diameter (ID) and outer diameter (OD) as well as the material composition. The length may also be required. The ID, OD, and length can either be measured by the control system using various sensor methods or inputted into the controller at the surface. The material may be inputted at the surface, but could be determined and inputted in other ways such as by use of sensors. The wellbore fluids, temperature, and hydrostatic pressure may also be required. By knowing these parameters, an equation can be used to determine the required/desired pressure needed to move the workpiece out (or in) to the desired distance and/or speed. The equation can be determined through empirical data or Finite Element Analysis (FEA) or a combination of both. Existing fundamental equations may also be used. Once the required pressure is known, the required voltage and/or current can be determined to achieve the desired pressure and therefore the desired speed and distance.

Set forth below are some embodiments of the foregoing disclosure:

Embodiment 1. An apparatus for applying a magnetic pressure to a work piece, the apparatus comprising: an inductor configured to be disposed in proximity to the work piece; and a controller electrically connected to the inductor and configured to control a supply of electrical power in order to output a first voltage over a selected frequency range to determine a frequency that provides a maximum current or a frequency that provides a current within a selected range of the maximum current to the inductor.

Embodiment 2. The apparatus according to any prior embodiment, further comprising a power supply responsive to an input from the controller and configured to supply a variable output voltage and a variable frequency output.

Embodiment 3. The apparatus according to any prior embodiment, further comprising a capacitor configured to adjust a resonant frequency of a circuit having the inductor.

Embodiment 4. The apparatus according to any prior embodiment, wherein the controller is configured to (i) provide an input to the power supply to select the first output voltage to be applied to the inductor, (ii) provide an input to the power supply to vary a frequency of the first output voltage over a selected frequency range, (iii) determine a work frequency that provides a maximum electrical current at the first voltage or an electrical current within a selected range of the maximum electrical current, (iv) provide an input to the power supply to select a second output voltage that is greater than the first output voltage to be applied to the inductor, (v) provide an input to the power supply to output the second output voltage at the work frequency, and (vi) connect the power supply outputting the second output voltage at the work frequency to the inductor in order to apply the magnetic pressure to the work piece.

Embodiment 5. The apparatus according to any prior embodiment, further comprising a switch controlled by the controller and configured to connect the power supply to the inductor.

Embodiment 6. The apparatus according to any prior embodiment, wherein the switch is further configured to interrupt the electrical energy being conducted into the inductor.

Embodiment 7. The apparatus according to any prior embodiment, wherein the controller is further configured to connect the power supply to the inductor for a time period that is less than one second.

Embodiment 8. The apparatus according to any prior embodiment, wherein the controller is configured to (i) provide an input to the power supply to select the first output voltage to be applied to the inductor, (ii) provide an input to the power supply to vary a frequency of the first output voltage over a selected frequency range at low power to the inductor using a resistor in a circuit having the inductor, (iii) determine a work frequency that provides a maximum electrical current at the first voltage or an electrical current within a selected range of the maximum electrical current, (iv) connect the power supply outputting the first voltage or a voltage within a selected range of the first voltage to the circuit to provide high power that is greater than the low power to the inductor at the work frequency in order to apply the magnetic pressure to the work piece.

Embodiment 9. The apparatus according to any prior embodiment, wherein the inductor comprises one or more turns of a conductor.

Embodiment 10. The apparatus according to any prior embodiment, wherein the one or more turns of the conductor are around a core configured to conduct a magnetic flux.

Embodiment 11. The apparatus according to any prior embodiment, further comprising a current sensor configured to sense electrical current flowing through the inductor and to provide measured current as an input to the controller.

Embodiment 12. The apparatus according to any prior embodiment, further comprising a performance sensor configured to sense performance of magnetic pressure applied to the work piece.

Embodiment 13. The apparatus according to any prior embodiment, wherein the performance sensor comprises a position sensor, a velocity sensor, or an accelerometer or some combination thereof.

Embodiment 14. The apparatus according to any prior embodiment, wherein the apparatus is coupled to a carrier configured to convey the apparatus through a borehole penetrating the earth.

Embodiment 15. A method for applying a magnetic pressure to a work piece, the method comprising: providing an input to a power supply to select a first output voltage using a controller, the power supply being coupled to an inductor that is disposed in proximity to the work piece; providing an input to the power supply to vary a frequency of the first output voltage over a selected frequency range using the controller; and determining a frequency that provides a maximum electrical current or a frequency that provides a current within a selected range of the maximum current at the first voltage to the inductor using the controller.

Embodiment 16. The method according to any prior embodiment, further comprising: providing an input to the power supply to select a second output voltage that is greater than the first output voltage using the controller; providing an input to the power supply to output the second output voltage at the frequency that provides the maximum electrical current or the frequency that provides a current within a selected range of the maximum current using the controller in order to apply the magnetic pressure to the work piece.

Embodiment 17. The method according to any prior embodiment, further comprising providing an input to a switch configured to connect the power supply to a circuit having the inductor using the controller.

Embodiment 18. The method according to any prior embodiment, further comprising providing an input to the switch to interrupt electrical energy being supplied to the inductor in response to a performance sensor sensing that a desired work application exceeds a performance threshold.

Embodiment 19. The method according to any prior embodiment, further comprising providing a capacitor in a circuit having the inductor, the capacitor having a capacitance value that provides for the circuit having a resonant frequency that matches or is within a selected range of a resonant frequency of the work piece.

Embodiment 20. The method according to any prior embodiment, further comprising sensing current flowing through the inductor at the first voltage using a current sensor and providing measured current as an input to the controller.

Embodiment 21. The method according to any prior embodiment, further comprising conveying the apparatus through a borehole penetrating the earth using a carrier.

In support of the teachings herein, various analysis components may be used, including a digital and/or an analog system. For example, the downhole electronics 8, the surface computer processing system 9, the frequency-modulated magnetic pressure pulse tool 10, the downhole tool 11, the controller 24, the current sensor 26, the performance sensor 27, the proximity sensor 202, and/or the standoff system 203 may include digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. The logging tool 10 is one non-limiting example of a carrier. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms. The term "configured" relates one or more structural limitations of a device that are required for the device to perform the function or operation for which the device is configured. The terms "first" and "second" and the like are used to distinguish elements and are not used to denote a particular order.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

The disclosure illustratively disclosed herein may be practiced in the absence of any element which is not specifically disclosed herein.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for applying a magnetic pressure to a work piece, the method comprising:
providing an input to a power supply to select a first output voltage using a controller, the power supply being coupled to an inductor that is disposed in proximity to the work piece;

providing an input to the power supply to vary a frequency of the first output voltage over a selected frequency range using the controller; and determining a frequency that provides a maximum electrical current or a frequency that provides a current within a selected range of the maximum current at the first voltage to the inductor using the controller.

2. The method according to claim 1, further comprising:

providing an input to the power supply to select a second output voltage that is greater than the first output voltage using the controller;

providing an input to the power supply to output the second output voltage at the frequency that provides the maximum electrical current or the frequency that provides a current within a selected range of the maximum current using the controller in order to apply the magnetic pressure to the work piece.

3. The method according to claim 2, further comprising providing an input to a switch configured to connect the power supply to a circuit having the inductor using the controller.

4. The method according to claim 3, further comprising providing an input to the switch to interrupt electrical energy being supplied to the inductor in response to a performance sensor sensing that a desired work application exceeds a performance threshold.

5. The method according to claim 1, further comprising providing a capacitor in a circuit having the inductor, the capacitor having a capacitance value that provides for the circuit having a resonant frequency that matches or is within a selected range of a resonant frequency of the work piece.

6. The method according to claim 1, further comprising sensing current flowing through the inductor at the first voltage using a current sensor and providing measured current as an input to the controller.

7. The method according to claim 1, further comprising conveying the inductor through a borehole penetrating the earth using a carrier.

* * * * *